Dec. 25, 1956 F. V. A. E. ENGEL 2,775,253
AUTOMATIC FLUID OPERATED CONTROL APPARATUS
HAVING A DERIVATIVE ACTION RESPONSIVE
TO A RATE OF CHANGE
Filed Dec. 27, 1954 2 Sheets-Sheet 1
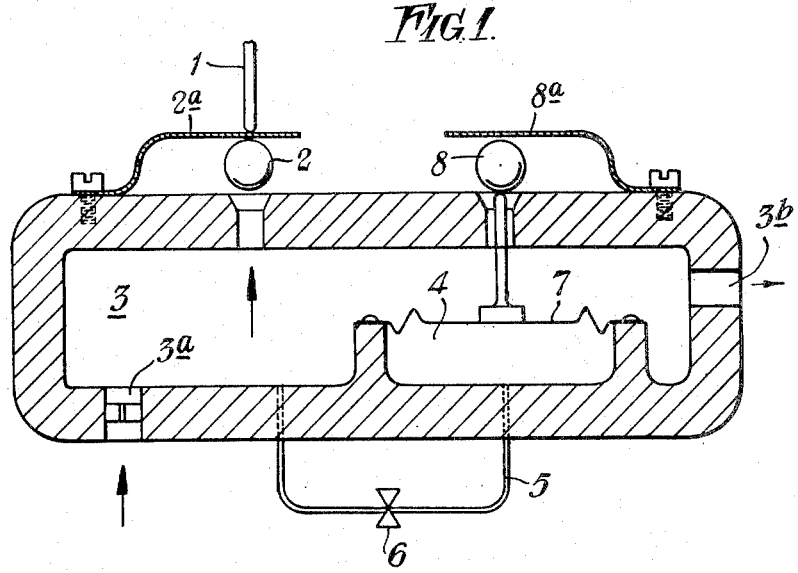
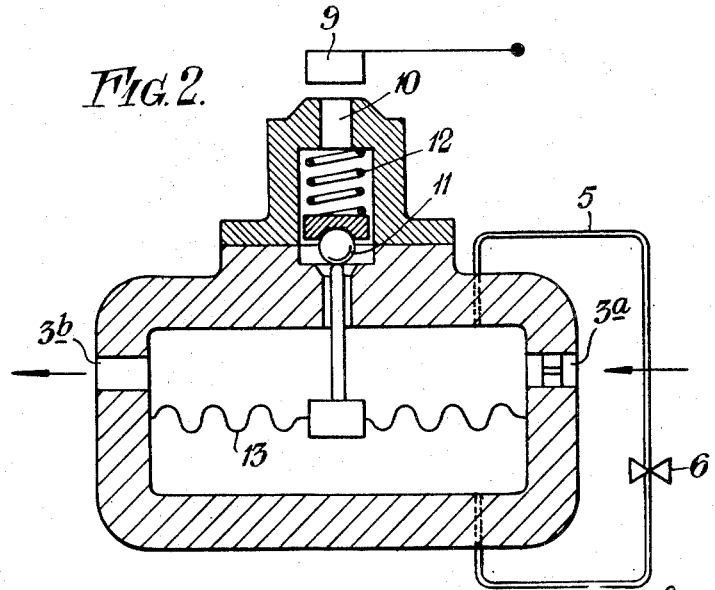
Inventor
Friedrich V. A. E. Engel
by Sommers & Young
Attorneys

United States Patent Office 2,775,253
Patented Dec. 25, 1956

2,775,253

AUTOMATIC FLUID OPERATED CONTROL APPARATUS HAVING A DERIVATIVE ACTION RESPONSIVE TO A RATE OF CHANGE

Friedrich Viktor Anton Ernst Engel, Park Royal, London, England, assignor to Electroflo Meters Company Limited, London, England Application December 27, 1954, Serial No. 477,884

4 Claims. (Cl. 137—82)

This invention concerns improvements relating to fluid-operated, that is pneumatically or hydraulically operated, automatic regulating or control apparatus including such apparatus of the follow-up variety. The invention is particularly concerned with apparatus of the kind in which a nozzle or other discharge outlet is provided with flow-restricting means or throttling means, such as a ball valve, a baffle or "flapper," which is operatively controlled by a device or instrument which measures a variable value and which restricts the effective size of the outlet, thus determining the static pressure of a fluid in an enclosed space from which the said fluid is discharging through the nozzle or outlet. In this manner, the static pressure may be functionally related to the deviations of the measured value from a set value which may be a fixed value or a value variable according to a programme.

A particular object of the invention is to provide simple but effective means for introducing a derivative action into the operation of such apparatus, that is an action responsive to the rate of change of the deviation of the measured value.

According to the invention, in fluid-operated automatic regulating or control apparatus, fluid pressure in an enclosed space is varied, in dependence upon deviation of a measured value from a predetermined value, by means for measuring the former value and means for introducing a derivative action, by enhancing the pressure variation in that space in functional relation with the rate of change of the deviation, comprises a substantially freely movable pressure-responsive device, such as a diaphragm or piston device, which controls a valve device and which is in communication directly with or is installed essentially within the said space, the said pressure-responsive device and valve device being separate from said measuring means.

Further, according to the invention, fluid-operated automatic regulating or control apparatus comprises an enclosed space in which the static pressure of a fluid is functionally related to deviation of a measured value from a predetermined value by measuring means, such as an instrument-controlled element, controlling a restricted outlet from the space, such as a nozzle, and, for introducing a derivative action, detecting means, separate from the said measuring means, which is responsive to the derivative of the said deviation and is directly connected to or installed in the said space so that it acts in conjunction with the measuring means and influences the pressure in the said space directly and in addition to the measuring means.

Thus, in apparatus in which the enclosed space has an outlet with flow-restricting means controlled in dependence upon the deviation of the measured value, the means for introducing the derivative action may comprise an additional device, such as a diaphragm or piston device, which is subject to the static pressure and arranged to control a further flow-restricting means in series or in parallel with the aforesaid flow-restricting means.

Suitably, the means for introducing the derivative action comprises a differential-pressure device which acts upon a valve controlling an outlet from the enclosed space and is directly connected to or installed in the said space. If a compressible fluid is employed, the differential-pressure device may comprise a diaphragm closing a chamber which is connected to the main enclosed space by a passage including a throttling means or, if an incompressible fluid is employed, the said device may comprise two spring-loaded pistons one acted upon by the pressure in the main enclosed space and the other by the pressure in a chamber connected to the said space by a passage including a throttling device. In either case, the valve is displaced from a normal position by a relatively considerable amount when there is a high rate of deviation of the measured value from the predetermined value, but gradual changes in the measured value produce practically no reaction or only slight reactions. The displacement of the valve affords a means of introducing a required derivative action into the operation of the apparatus.

In contradistinction to prior proposals, the additional means provided in accordance with the invention is directly associated with or forms a unit with the primary actuating means of the apparatus. This ensures quick response without material time lag, lost motion, inaccuracy or other source of error liable to be introduced when a separate unit is employed which has to be connected to the apparatus by capillary tubing, linkage or the like. The invention ensures that the derivative action is produced directly and immediately, so that reliable performance of the apparatus is ensured.

Several embodiments of the invention will now be described, by way of example only, with reference to the accompanying diagrammatic drawings:

Figure 1 illustrates a part of a control apparatus in which the static pressure of a compressible medium is related to variations of a measured value by means of ball valves acting in parallel.

Figure 2 illustrates a similar arrangement in which, however, a baffle acts in series with a ball valve.

Figure 3:
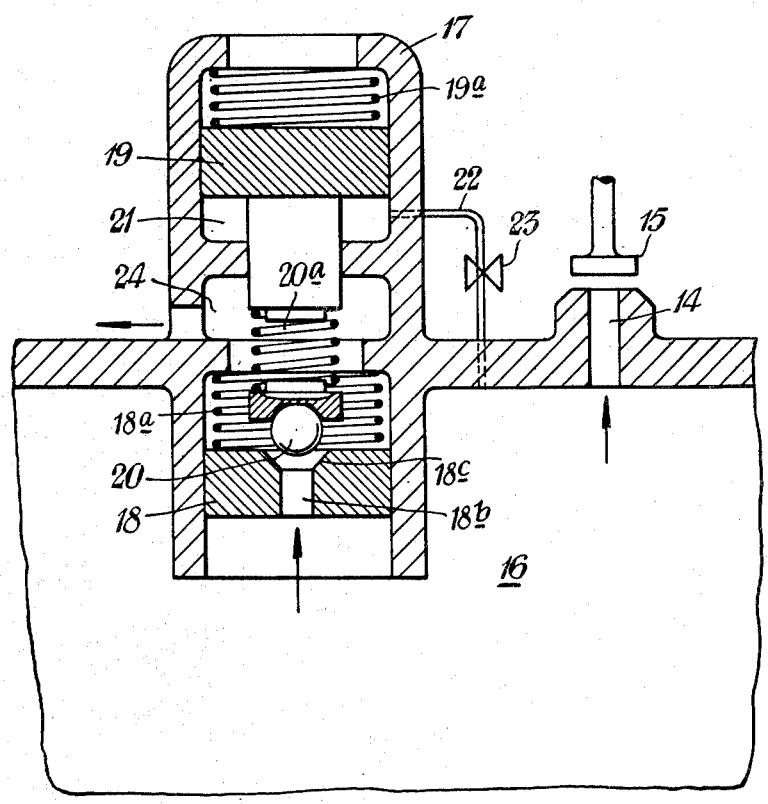
Figure 3 shows part of a liquid-operated control apparatus including a differential-pressure piston device.

The apparatus of Figure 1 comprises two flow-restricting devices arranged to operate upon separate parallel outlets. An instrument (not shown) for measuring a variable value acts through a link or rod 1 upon a ball valve 2 loaded by a spring 2a which controls an outlet from an enclosed space 3 and thus regulates the static pressure of a compressible medium, for example compressed air, in the space 3 so that it is related to the deviations of the measured value from a predetermined value. The space 3 is connected at 3a to a supply line for the medium and also at 3b to a valve, booster relay or the like which operates the gear to be controlled directly or through amplifying devices. The space 3 also includes a chamber 4 which is connected to the said space through a passage 5 controlled by fixed throttling means and/or adjustable throttling means 6. A diaphragm or the like 7 which seals the chamber 4 is operatively engaged with or connected to a ball valve 8 loaded by a spring 8a controlling a further outlet. There may be further loading springs (not shown) acting upon the diaphragm 7. Such springs may be made adjustable.

The aforesaid apparatus operates with a derivative action, that is an action dependent upon the rate of change of the deviation measured: If a sudden upward movement is imparted to the link 1 by the measuring instrument, there will be a considerable and sudden drop in pressure in the space 3 resulting in an upward movement of the diaphragm 7. This will open the ball-valve (8) to such an extent that the pressure drop in the space (3) will be considerably increased. After the elapse of a period of time functionally related to the size of opening of the throttling means 6 in the conduit 5, the pressures in the space 3 and chamber 4 will become equalised. The additional effect introduced by the valve 8 then ceases and, although discharge past this valve continues, the pressure in the space 3 will be mainly governed directly by the deviation of the measured value as indicated by the position of the link 1. The converse effect in the event of a sudden downward movement of the link 1 will be obvious. If, however, the deviations are very gradual, there will be sufficient time for pressure equalisation between the space 3 and chamber 4, so that changes in the setting of the valve 8 may be of such a small order that they do not substantially affect the pressure in the space 3.

Figure 2 shows a further embodiment of the invention using a compressible medium, but in which the two flow-restricting devices are arranged in series. The measuring instrument is operatively connected to a baffle or "flapper" 9 which controls the discharge from a nozzle 10. This discharge also depends upon the position of a ball valve 11 which is loaded by a spring 12. A corrugated diaphragm 13 controls the valve 11 in dependence upon the rate of change of the deviation of the measured value in a manner very similar to that described above.

Figure 3 illustrates a form of apparatus using a liquid under pressure, particularly apparatus of the kind in which the static pressure, in the balanced condition of the apparatus, remains practically constant. Deviations from the predetermined value act to vary the gap between a discharge nozzle 14 and baffle 15 whose movement is functionally related to the movements of a measuring instrument, whereby the static pressure in the enclosed space 16 is similarly affected. The device which introduces a derivative action is enclosed in an extension 17 of the casing of the space 16. It comprises a unit which is responsive to pressure difference. For instance and as illustrated, this unit comprises a piston 18 loaded by a spring 18a and a piston 19 loaded by a spring 19a. The piston 18 contains a nozzle 18b and valve seating 18c co-acting with a ball-valve 20 to which floating support is afforded by a compression spring 20a abutted against the piston 19. The chamber 21 below the upper piston 19 is connected to the space 16 by a passage 22 which includes throttling means 23. The intermediate space 24 is open to discharge. The manner of operation in this case is substantially the same as has been described in connection with Figure 1, the static pressure in the space 16 being influenced not only by the baffle 15 (as described for the valve 2) but also by the valve 20 (as described for the valve 8). In the event of an abrupt variation of pressure in the space 16, the piston 18 will move relatively to the valve 20 in a direction which will result in the said pressure variation being increased and a derivative action introduced. The pressure in the chamber 21 will then become equalised with that in the space 16 and the piston 19 will move so that the relative position of the valve 20 with respect to the piston 18 will be substantially restored. In the event of a very gradual variation of pressure in the space 16, the pistons 18, 19 will move substantially together and no derivative action will be produced.

Instead of stationary outlets controlled by movable valves, baffles or the like such as have been described above, use may be made of buoyantly suspended nozzles for controlling the pressure in the enclosed space.

In all cases in which the behaviour of the device or unit under control (i. e. such coupled to 3b) is liable to exhibit instability, for example due to its possessing a poor degree of inherent control, additional stabilising means of well-known kind will have to be introduced, for example such means which introduce proportional action and/or integral action.

Apparatus in accordance with the invention may be used in conjunction with a series of relay stages controlled by it. Some or all of these stages may themselves comprise pressure-responsive diaphragm or piston units similar to those described above.

I claim:

1. Fluid-pressure operated automatic regulating apparatus comprising, in combination with a chamber having connections for communication with a supply of fluid at substantially constant pressure and with operating means responsive to the static pressure in the said chamber, two separate valve units acting upon restricted outlets from the said chamber for controlling the static pressure in the latter, one of the said valve units comprising a first valve device controlling the degree of opening of one of the said restricted outlets and a valve-actuating device movable in dependence upon deviation of a measured value from a predetermined value and arranged to act upon the said valve device for varying the degree of opening of the said outlet and thereby, primarily, the static pressure in the said chamber in dependence upon the said deviation, while the other valve unit, constituting means for introducing a derivative action whereby the static-pressure variation in the said chamber is enhanced in dependence upon the rate of change of the deviation and therefore of the pressure in the said chamber, comprises a freely movable pressure-responsive device directly bounding a part of the said chamber and a second valve device actuated directly and solely by the said pressure-responsive device and controlling the degree of opening of the other of the said restricted outlets.

2. Apparatus as claimed in claim 1, in which the said pressure-responsive device comprises a movable element of which one side bounds the said chamber and the other side a second chamber which is connected to the first chamber by a passage including a throttling means.

3. Apparatus as claimed in claim 1 and employing an incompressible fluid, in which the pressure-responsive device comprises two spring-loaded pistons, one directly exposed to the pressure in the said chamber and the other to the pressure in a second chamber connected to the first chamber by a passage including a throttling means.

4. Apparatus as claimed in claim 3, in which one piston is operatively connected to the valve member of the valve and the other to the valve seating thereof.

References Cited in the file of this patent
UNITED STATES PATENTS

| | | |
|---|---|---|
| 2,264,261 | Erbguth | Nov. 25, 1941 |
| 2,630,824 | Eckman | Mar. 10, 1953 |
| 2,638,922 | Caldwell | May 19, 1953 |
| 2,712,321 | Grogan | July 5, 1955 |